Robert E. Harkins
Paul E. Straight
INVENTORS
BY Gerald B. Tjoflat
Their Attorney

United States Patent Office 3,047,647
Patented July 31, 1962

3,047,647
CONTROL SYSTEMS AND COMPONENTS THEREOF
Robert E. Harkins, Orrville, Ohio, and Paul E. Straight, Pittsburgh, Pa., assignors to Hagan Chemicals & Controls, Inc., Pittsburgh, Pa., a corporation of Pennsylvania
Filed Oct. 26, 1959, Ser. No. 848,764
3 Claims. (Cl. 13—6)

This invention relates to control systems and components thereof. More particularly the invention relates to temperature control systems for glass fibre or filament dies that is capable of maintaining the temperature of the glass melt in such dies within extremely close limits, say ±¼° F. in 2000° to 2200° F., whereby the diameters of the fibres or filaments are held to extremely close tolerances. The invention pertains also to components of such control systems.

The manufacture of glass fibres or filaments of extremely fine diameters involves the melting of glass, heating it to a predetermined temperature and maintaining that temperature within very close limits and passing the molten glass through small orifices by gravity and winding tension. The temperature of the glass, hence its viscosity, at the orifices of the die, is an important factor in the control of the diameter of the respective fibres issuing therefrom. The fibres cool quickly after issuing from the orifices and are gathered on suitable windup or gathering rolls which apply some tension to the fibres.

For certain types of glass fibre, the temperature of the glass at the orifices must be maintained at a selected temperature which varies with the composition of the glass melt, within a range of about 2000° to about 2200° F. and the control system must be capable of maintaining the selected temperature within close limits of the order of ±¼° F.

The orifices may be formed in the bottom of a cast platinum die heated by electric current. That current is so regulated that the selected temperature is maintained within the limits above indicated.

The bowl of the die is preferably of low volume so as to minimize the thermal inertia effect. Molten glass is delivered to the die bowl at a rate sufficient to match the rate at which glass discharges from it as fibre.

The control system embodies a thermocouple bridge circuit, an amplifier and demodulator circuit which receives, as input, the output of the thermocouple bridge circuit, and a combination of magnetic amplifiers, magnetic controllers and saturable reactors so arranged as to regulate the current to the glass drawing die to values which will maintain the temperature of the melt at that value necessary to produce glass fibres of the diameters required.

The invention also relates to improvements in circuitry for magnetic amplifiers whereby they may be endowed with various operational characteristics, depending upon the nature of the inputs to such amplifiers and the relationship to be maintained between its output and input.

An object of this invention is to provide a temperature control system of the type set forth above that shall be accurate and precise in its operation, and substantially free of moving parts.

Another object is to provide a system having components so arranged that the system has reset, proportional and rate response and maximum heating current limit control for the glass drawing die.

A further object is to provide modifications of magnetic amplifiers whereby they may have various operational characteristics, such as, feed back coupled with one or another of the following features:

(a) An integrator function;

(b) Integral plus proportional;
(c) Rate;
(d) Rate plus proportional gain; and
(e) Feed back coupled with a plurality of inputs having, respectively, proportional rate and set point characteristics in accordance with the nature of the particular individual inputs involved.

The above and other objects of the invention will be apparent to those of ordinary skill in the art to which the invention pertains, from the following description taken in conjunction with the accompanying drawings.

Figures 1, 2:
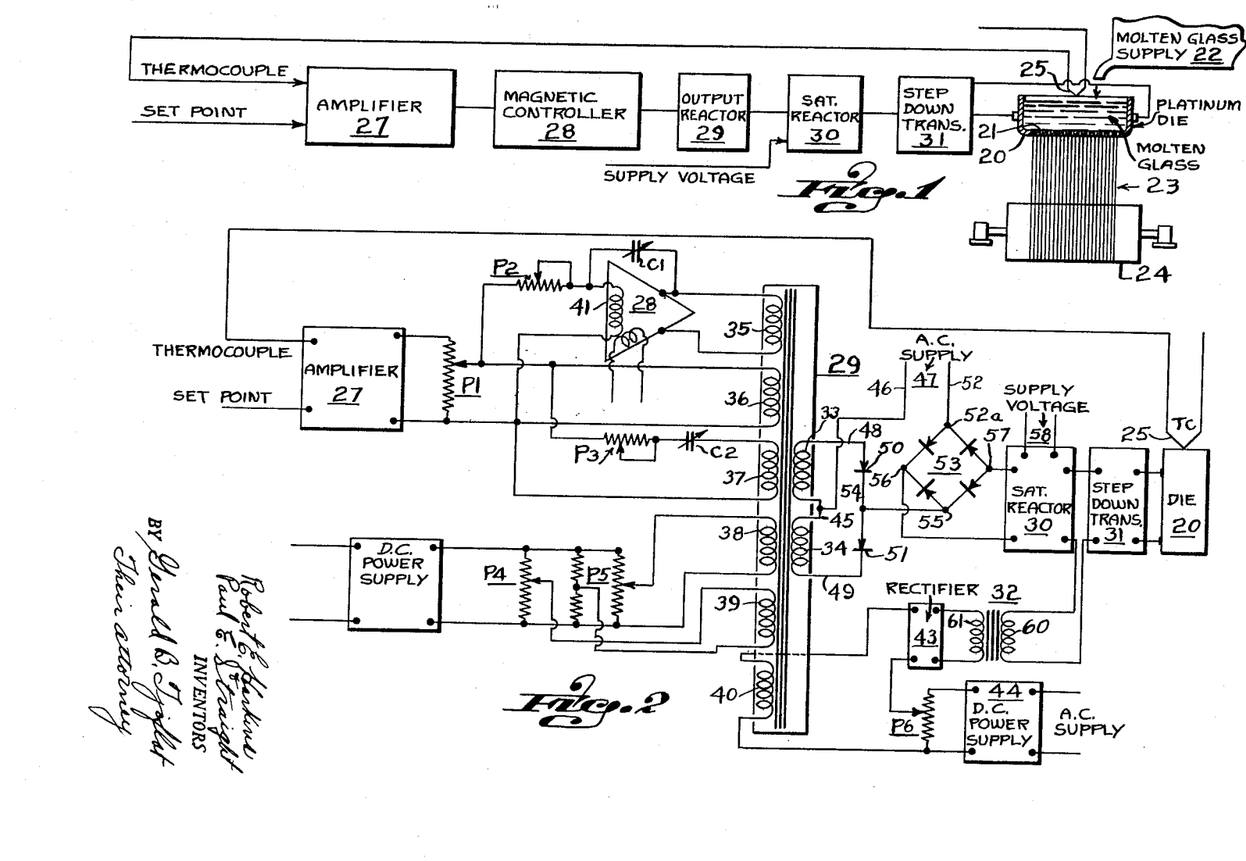
FIGURE 1 is a schematic illustration of a control system for regulating the temperature of molten glass in a glass drawing die to extremely accurate limits, the components of the system being shown as block diagrams identified by legends.
FIG. 2 is a schematic illustration of the system shown in FIG. 1 in which some of the components are shown in greater detail.

In FIG. 1 of the drawings is shown schematically a glass drawing die 20 which may have a rectangular shape in plan view, and having a relatively flat bottom provided with a plurality of orifices 21 through which molten glass issues in the form of fibres or filaments. The die 20 is preferably of metal and considering the temperature conditions at which it operates, it is preferred that the die be made of cast platinum. The volume of the die 20 is relatively small so as to minimize thermal inertia. An inordinate amount of thermal intertia would interfere with the preciseness of the regulation of the temperature of the glass at the orifices 21. That temperature must be maintained in order that the desired diameter of filament or fibre may be obtained. Molten glass may be supplied from a glass tank 22, to the die 20 at an equal rate to that at which the glass is issuing from the die as fibre.

The diameter of the glass fibres or filaments 23 issuing from the orifices 21 is dependent upon the viscosity of the glass in the die, the viscosity being a function of or directly related to the temperature. If the temperature of the glass exceeds a relatively critical value, the drawn fibres may be too thick in that the glass might flow through the orifices too rapidly. If the glass in the die is too cool, its rate of flow out of the bowl would be relatively slower resulting in fibres that may be too thin or fine because of the attenuation factor.

In practice it has been found that the control system must be capable of maintaining the temperature of the glass in die 20 at a value between 2000° and 2200° F. depending upon the composition of the glass. For any given composition, the controlled temperature must be maintained substantially within plus or minus ¼° or better.

The die 20 and the glass therein is heated by electric current. The glass in its molten state at the temperatures to which it is heated is conducting to a greater or lesser degree. Therefore, it is not certain whether all of the heating of the glass results from the heat generated in the bowl of the die, or whether it is derived from the $I^2R$ loss in the bowl as well as in the molten glass itself. At any rate, by supplying current to the bowl as indicated and regulating it properly, the glass is maintained in a molten state at the temperature desired.

The glass fibres 23 issuing from the orifices 21 are gathered or collected on a gathering device 24 shown schematically as comprising a roll mounted for rotation on suitable bearings and provided with means (not shown) for driving the same, such means being commonly known in this art. The speed of the roll is such as to maintain tension in the fibres.

The temperature of the glass in the die 20 is sensed by a thermocouple 25 associated with a Wheatstone bridge circuit 26 (see FIGS. 3 and 4), having a temperature set point means. The output of the bridge is supplied as input to an amplifier demodulator 27, a magnetic amplifier or controller 28 which receives output from the amplifier 27, an output reactor 29 that receives the output of the magnetic controller as its controlling input and a saturable reactor 30. The saturable reactor output is supplied to a step down transformer 31, the output of which is supplied to the bowl of the die 20. In series with the step down transformer, that is, in series with the input side thereof, is a current transformer 32 (FIG. 2) the output of which is rectified and supplied to the output reactor 29 and serves to limit the maximum value of the current supplied the die to a predetermined value.

The E.M.F. of thermocouple 25 is a measure of the temperature of the glass in the die and that E.M.F. is compared to the set point E.M.F. provided in the bridge circuit 26. The difference between the set point E.M.F. and the E.M.F. of the thermocouple 25 represents the temperature error, that is, the difference between the desired temperature and the actual temperature of the glass. That error voltage is amplified to a usable power level by the amplifier-demodulator 27.

The output of the amplifier-demodulator 27 is divided and supplied as input to the magnetic amplifier or controller 28 and to certain control windings of the output reactor 29.

The output reactor 29 includes a core structure indicated schematically at 33 on which gate windings 33, 34 and a plurality of control windings 35, 36, 37, 38, 39, and 40, are wound. One portion of the divided output of amplifier 27 is applied to the input winding 41 of magnetic amplifier or controller 28; the other portion provides two input signals for the reactor 29, namely, for the windings 36, and 37. See FIG. 2.

The magnetic amplifier or controller 28, in response to the input to the winding 41, produces an output to winding 35 of the reactor 29, which is proportional to the time integral of the temperature error, and may be called the reset signal. The output reactor 29 adds or sums up the reset, proportional and rate signals and amplifies their sum to a power level sufficient to operate the saturable reactor 30. Reactor 30 operating in conjunction with the step-down transformer 31, commonly known as a "bushing," controls the glass heating current delivered to the die 20.

FIGURE 2 illustrates the system of FIG. 1 in greater detail. As there shown, the amplified temperature error signal generated by the amplifier 27 is impressed on a potentiometer P1 which attenuates the signal to provide proportional band control. That signal is divided and operated on to provide the three control signals representing the rate (winding 37) reset (winding 35) and proportional band (winding 36) characteristics. Reset is obtained by employing a magnetic amplifier or controller 28 having a high-gain, as an operational controller. A potentiometer P2 and a condenser C1 connected as shown to input winding 41 of amplifier 28, determine the reset time of the system. The output of the magnetic amplifier or controller 28, which supplies winding 35, represents the time integral of the temperature error, being proportional to the rate of change thereof. Rate action is obtained by employing a potentiometer P3 and a capacitor C2 in series with winding 37 of reactor 29. Potentiometer P3 and capacitor C2 control the rate-time constant of the system and, being adjustable, that constant can be adjusted.

Thus the three windings 35, 36 and 37 of the reactor 29 are supplied with signals which are, respectively, proportional to the time integral of the temperature error, (otherwise known as reset signal), proportional to the temperature error, and proportional to the rate of change of the temperature error. Windings 38 and 39 of reactor 29 are, respectively, automatically and manually controlled bias windings, while winding 40 limits the current supplied to die 20 to a predetermined maximum value.

Reactor 29 is of the type known as "self-saturating," that is, with no current in any control winding, its output is maximum. Since the output of the amplifier-demodulator 27 is so arranged that when the temperature error is zero, the output is zero, and for positive or negative errors the output becomes positive or negative, it is desirable to so bias the reactor 29 that when there is no current in any control winding other than the bias winding 38, its output is at mid scale. This is done simply by supplying current to the bias winding 38 from a D.C. supply. The amount of that bias can be adjusted by means of a potentiometer P5. Manual control of bias may be accomplished in the same way by employing a potentiometer P4 that supplies manual control bias winding 39. Both the bias winding 38 and the manual control winding 39 may be energized from the same D.C. power supply as shown in FIG. 2.

Control winding 40 of the reactor 29 is employed to limit the current in the die 20 to a predetermined maximum value and is intended to prevent the current in the die from exceeding a preset value. The current transformer 32 is employed to measure the current in the primary winding of the step down transformer 31 which is proportional to the current in the die.

The output current of the transformer 32 is rectified by a single direction rectifier 43 to produce a D.C. voltage. Another D.C. voltage is developed by means of an A.C. power supply and rectifier system 44 and impressed on a potentiometer P6 which is adjustable. The difference between the voltage generated by the current transformer rectifier circuit 43 and the voltage of potentiometer P6 is supplied to the current limit winding 40 of the controller 29. However, as current can flow in one direction only through the rectifier 43, it can flow in only one direction in the current limit winding of the controller 29. Therefore, if the voltage across potentiometer P6 is higher than the voltage derived from the current transformer, no current flows in the current limit winding 40, because of the blocking action of the rectifiers. If, however, the voltage derived from the current transformer exceeds the voltage across potentiometer P6, current flows in the current limit winding thereby reducing the output of the controller 29 and the magnitude of the current flowing in the die 20.

The output or gate windings 33 and 34 of the reactor 29 are connected in parallel. The common connection 45 between these windings is connected to one side 46 of an A.C. voltage supply 47, while the end terminals 48 and 49 thereof are in circuit with series connected diodes 50 and 51 which conduct in the same direction. Line 52 of the A.C. supply 47 is connected to one input terminal 52a of a full wave rectifier bridge 53 while the connection 54 between diodes 50 and 51 is connected to input terminal 55 of the bridge 53. The output terminals 56 and 57 of bridge 53 are connected to and control the saturable reactor 30.

The saturable reactor 30 is supplied with A.C. voltage from the supply 58. The output of the reactor 30 is proportional to the output of the rectifier bridge 53, and that ouput is supplied to the input winding of the step down transformer 31. The output winding of the step down transformer 31 is connected to the die as shown in FIGS. 1 and 2.

The current transformer 32 has two windings, an input winding 60 and an output winding 61. The input winding 60 is connected in series with the input or primary winding of the step down transformer 31. The output winding 61 of the current transformer, as stated, is connected to the single-direction conducting rectifier 43. The output voltage of that rectifier is, as shown in FIG. 2, in series with the voltage of the potentiometer P6 and is impressed upon the current limiting winding 40 of the reactor 29.

It has been found in practice that it is difficult to hold the temperature of the glass in die 20 precisely at the set point value within the small tolerances permitted, say ¼° F.± unless the potentiometers employed in the control system are carefully prepared. If the metal of wiper contact arms of the potentiometers differs from the metal employed in the resistance wire thereof, the temperature of the glass in the die will drift. It has been found that the "drift" can be eliminated by making the wiper contact arms and the resistance wire, of the respective potentiometers P1 to P6, of the same metal or alloy. When these metals are of the same composition, the temperature drift just mentioned is avoided.

Figure 7:
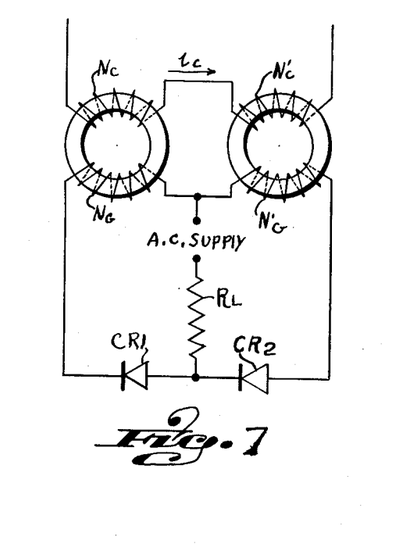
FIG. 7 is a simplified schematic illustration of a magnetic amplifier embodied in the control systems of FIGS. 1 and 2.
Figure 8:
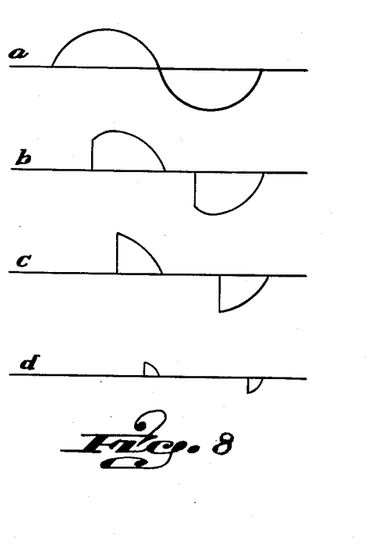
FIG. 8 is a graph showing the output of a magnetic amplifier corresponding to various values of input control current thereto.

In FIGURES 7 and 8 there are illustrated, in a simplified form, a reactor of the type indicated at 29 and various outputs therefrom. The schematic illustration of FIG. 7 is one which has an A.C. input and an A.C. output. In the circuit of FIG. 2 the output of the bridge rectifier 53 is D.C. rather than A.C. However, the purpose of FIG. 7 and FIG. 8 is to illustrate the principle of operation of the reactor 29.

In FIG. 7, the reactor is shown as comprising two cores on which output gate windings $N_g$ and $N'_g$ are wound, respectively, and connected in parallel to the A.C. supply. These cores also include control windings $N_c$ and $N'_c$ connected in series, which carry control current $i_c$. The input windings $N_g$ and $N'_g$ operate in parallel through a load resistor $R_L$ and control diodes CR1 and CR2.

Each core in the arrangement of FIG. 7 acts as a switch. When the cores are unsaturated, the operational effect is that of the switches being open, and all of the supply voltage appears across either the gate windings or the rectifiers CR1 or CR2. When the core is saturated, all of the supply voltage appears across the load $R_L$. The switch is controlled by ampere turns applied to the core. The ampere turns can be provided by either the current in the control winding or the load current in the gate windings.

If there is no current flowing in the control windings $N_c$ and $N'_c$, the half-wave pulses of the A.C. source will saturate the cores, causing them to act as closed switches. In that condition, the diodes CR1 and CR2 conduct on alternate half-cycles of the supply voltage and essentially all of the supply voltage appears across the load resistance $R_L$. That condition is illustrated by the curves (a), (b), (c) and (d) of FIG. 7. The condition where substantially all of the supply voltage appears across the load is represented by curve (a). If control current is supplied to the control windings, the switch can hold off during any desired portion of the supply wave-form. The output wave-forms thus produced are represented by curves (b), (c), and (d).

Figures 3, 4:
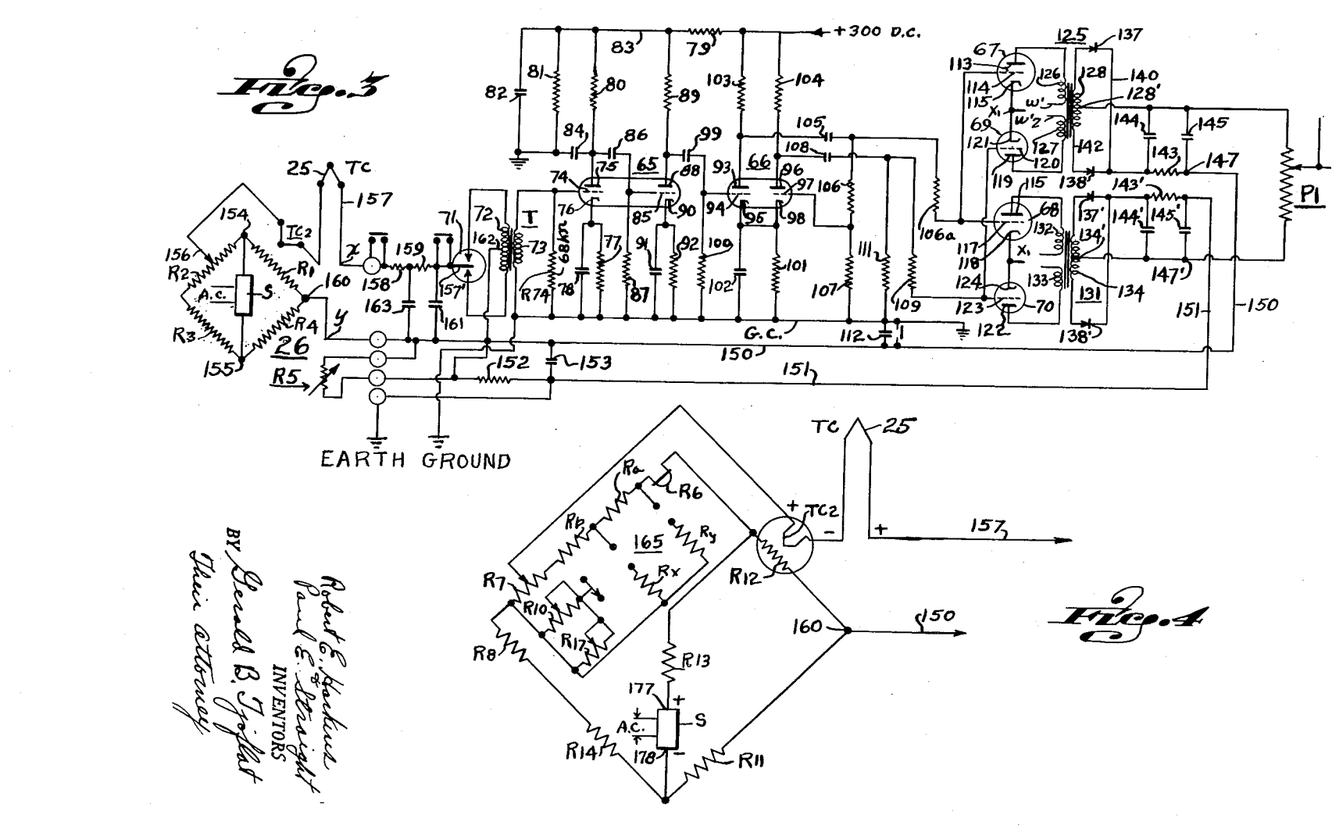
FIG. 3 is a more or less diagrammatic illustration of an amplifier and demodulator circuit provided with a thermocouple-bridge input circuit, the thermocouple responding to the temperature of the glass in the die of FIGS. 1 and 2, and an output circuit that supplies control signals to components of the system shown in FIGS. 1 and 2.
FIG. 4 is a more detailed schematic illustration of the thermocouple-bridge circuit of FIGS. 1, 2, and 3, the bridge circuit being provided with a Zener diode controlled D.C. voltage source.

Amplifier 27—FIGS. 3 and 4

The amplifier-demodulator 27 and the thermocouple-bridge circuit therefor are shown in greater detail in FIG. 3. The amplifier-demodulator comprises a twin triode detector or voltage amplifier 65, a twin triode amplifier 66 and demodulators 67, 68, and 69, 70, controlled by the amplifier 66.

The output of the bridge circuit 26, which is a D.C. voltage, whose magnitude is proportional to the difference between the voltage generated by the thermocouple 25 and the set point of the D.C. bridge, is supplied to a vibrator 71 that converts the thermocouple-bridge output voltage to an A.C. voltage having a frequency of say 60 cycles per second. The vibrator 71 supplies the input winding 72 of a transformer T whose output winding 73 supplies the input or control grid 74 of the detector twin triode 65. One-half of the detector 65 includes a plate 75, the grid 74 and an indirectly heated cathode 76. The cathode 76 is connected to ground conductor G.C. through a resistor 77 having a resistance value of about 6800 ohms, which is connected in parallel to a capacitor 78 having a capacity of about 25 mfds.

The plate 75 is supplied with D.C. voltage from a source voltage of the order of 300 volts through a resistor 79 having a value of about 22K ohms (K signifying 1000) and a load resistor 80 having a value of approximately 220K ohms. A parallel resistance capacity circuit having a 10K resistor 81 and a 20 mfd. capacitor 82 are provided between the D.C. voltage conductor 83 and ground. A blocking condenser 84 of about 0.1 mfd. is connected between ground and plate 75. The grid 85 of the second portion or half of the twin triode 65 is connected to plate 75 through a condenser 86 of about 0.1 mfd. capacity and to ground through a resistor 87 of about 470K ohms. Plate 88 is connected to voltage supply conductor 83 through a resistor 89 of about 220K ohms, and the cathode 90 is connected to ground by a parallel capacitor resistance circuit comprising a 25 mfd. condenser 91 and a resistor 92 of about 6.8K ohms. The voltage at plate 88 controls one of the grids of twin triode 66. That triode has a plate 93, a grid 94 and an indirectly heated cathode 95 in one half thereof and a plate 96, a grid 97 and an indirectly heated cathode 98 in the other half. Control voltage for grid 94 is supplied by plate 88 through a condenser 99 of about 0.1 mfd., the grid also being connected to ground by a resistor 100 of about 470K ohms. The cathodes 95 and 98 are connected to ground by a parallel R.C. circuit comprising resistor 101 of about 2.2K ohms and a condenser 102 of about 25 mfds. capacity.

Plates 93 and 96 are connected, respectively, by resistors 103 and 104 to the +300 volt D.C. supply, each of these resistors having about 100K ohms. Variations in voltage at plate 93 control the grid 97 and the grids of tubes 67 and 68, while the voltage appearing at plate 96 controls the grids of tubes 69 and 70.

The voltage at plate 93 is supplied through a condenser 105 of about 0.047 mfd. and a resistor 106 to the grid 97, that grid being connected to ground by a resistor 107 of about 15K ohms. The grids of tubes 67 and 68 are connected to condenser 105 by a resistor 106a of about 220K ohms.

The voltage appearing at plate 96 constitutes the grid voltage of tubes 69 and 70 and is supplied through a series CR circuit comprising a condenser 108 of about 0.047 mfd. and a resistor 109 of about 220K ohms. The junction 110 between condenser 108 and resistor 109 is connected to ground conductor G.C. by a resistor of about 220K ohms. The conductor G.C. is connected by a condenser 112 to a feed back circuit, to be explained infra.

Demodulator tubes 67 and 68 comprise, respectively, plate 113, a grid 114 and an indirectly heated cathode 115, and a plate 116, a grid 117 and an indirectly heated cathode 118. The grids 114 and 117 are controlled by the voltage at resistor 106a.

Figure 5:
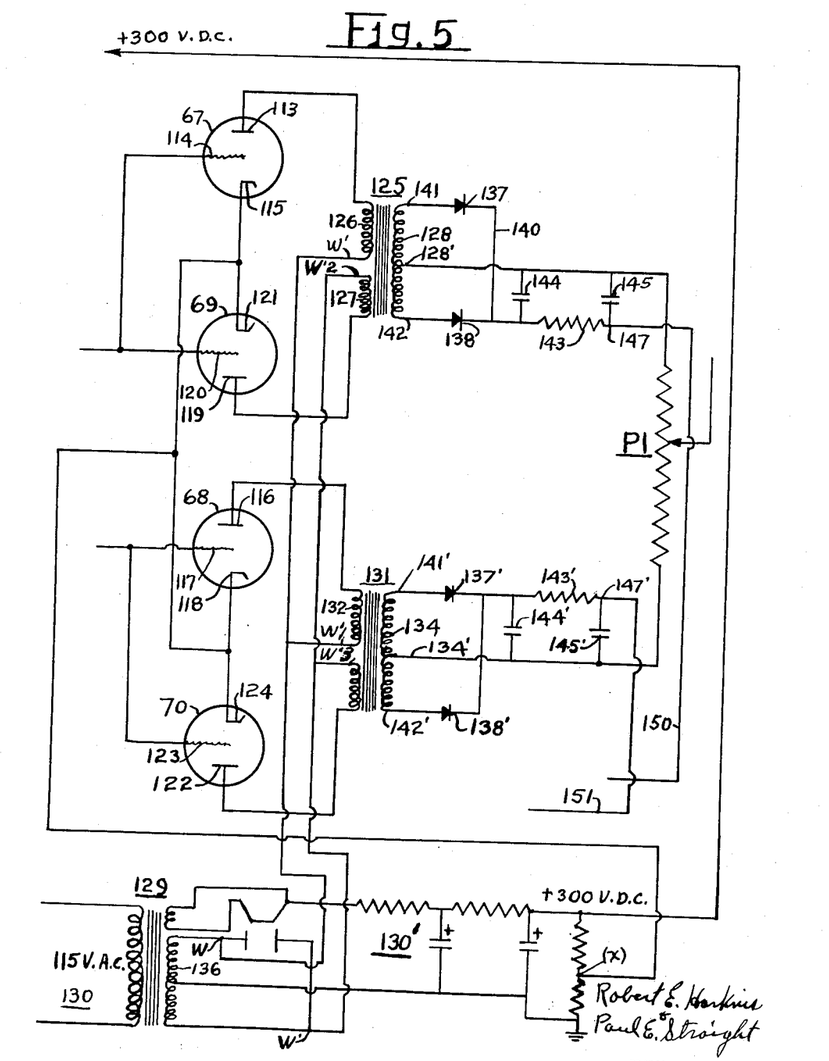
FIGURE 5 is an enlarged view of a portion of the circuit of FIGURE 3.

Tubes 69 and 70 comprise, respectively, a plate 119, a grid 120 and an indirectly heated cathode 121, and a plate 122, a grid 123 and an indirectly heated cathode 124. The grids are provided with control voltage appearing at resistor 109. Associated with the plate circuits of tubes 67 and 68 is a transformer 125 having input windings 126 and 127 and an output winding 128 provided with a center tap 128'. The windings 126 and 127 are energized by a transformer 129 of the power supply or power pack 130 having a filter 130', that supplies the heaters (not shown) for the cathodes of the tubes 65—70, and the plate voltages therefor. See FIG. 5.

Similarly, a transformer 131 is provided for tubes 68 and 70. The transformer includes two input windings 132 and 133 and an output winding 134 provided with a center tap 134'. The input windings 132 and 133 are in series with the circuits of plates 116 and 122, respectively.

The terminals W' and W'1 of windings 126 and 132 are connected to terminal W of the output winding 136 of transformer 129, while terminals W'2 and W'3 of windings 132 and 133 are connected to terminal W' of the power winding 136.

The output winding of transformer 125 is provided with a full wave rectifier circuit including rectifiers 137 and 138 connected by a conductor 140 to the base contacts or terminals thereof, in opposed relation across the terminals 141 and 142 of the center tap winding 128. A load circuit, comprising a resistor 143 of about 50 ohms and capacitors 144 and 145, is connected to the center tap 128' of the winding 128 and the conductor 140. The condensers 144 and 145 may have capacities of about 250 and 10 mfds., respectively, and resistor 143 may have a resistance of about 50 ohms. Condenser 144 is connected directly across the center tap 128' and the base terminals of the rectifiers, while the resistor 143 and condenser 145 are connected in series with the same.

The output winding 134 of transformer 131 is provided with a rectifier circuit similar to that provided for winding 128. Therefore, the corresponding components have been designated by the same reference characters with primes affixed.

The potentiometer P1 is connected across the center tap connections 128' and 134' of transformer windings 128 and 134, while the feed back circuit is connected to the junction points 147 and 147', respectively, of condenser 145 and resistor 143 and a condenser 145' and resistor 143'.

The voltage impressed on potentiometer P1 will vary in magnitude and polarity with the difference between the E.M.F. of the thermocouple 25 generated at the glass die 20 and the set point of the potentiometer.

The resistors 143 and 143' develop voltages that vary with the outputs of transformers 125 and 131, but so long as the potentials at junction points 147 and 147' are equal and of the same polarity, the feed back voltage is zero. When the potentials are unequal in magnitude, or in magnitude and polarity, the feed back voltage will be negative or positive and that magnitude will be proportional to the difference between them. The feed back voltage is supplied to the input circuit of the amplifier and so modifies it as to bring the potentials at junction points 147 and 147' back to zero difference. See FIG. 3.

The feed back voltages are transmitted by conductors 150 and 151 to the input circuit of amplifier 27 through a filter which includes a resistor 152 of about 10K ohms and a condenser 153 having a capacity of about 250 mfds.

The bridge in its elementary form contains in its four branches resistors R1, R2, R3 and R4 and is provided with a source S of constant D.C. voltage of about 1.345 volts which is maintained constant by a Zener diode as will be seen in connection with FIG. 4. This voltage is a constant reference voltage and is applied to bridge terminals 154 and 155. The reference junction TC2 of the thermocouple is associated with branch R1 whose thermal characteristics are such that its resistance changes in the direction required to compensate for changes in ambient temperature at the reference junction TC2.

One terminal of the reference junction TC2 is connected to a slide contact 156 provided for branch R2 and serves to establish the temperature set point for the system. The set point represents that value of temperature which the control system is to maintain in the glass of die 20. The output terminal 157 of the hot junction TC1 of the thermocouple 26 is connected to the vibrating contact 157 of the vibrator 71 through series connected resistors 158 and 159 having about 10 ohms each. The input terminal 160 of the bridge is connected to feed back conductor 150.

Feed back conductor 150 is connected through a condenser 161 of about 250 mfds. to the vibrating contact 157' of vibrator 71, and conductor 151 is connected from the bridge side of resistor 152 to the center tap 162 of input winding 72 of the transformer T. A condenser 163, having about 250 mfds. capacity, is connected from the feed back conductor 150 to the junction of resistors 158 and 159.

An adjustable resistor R5 is connected to bridge terminal 160 and feed back conductor 151 and provides a means of adjusting the gain of the amplifier 27. Thus a suitably calibrated voltmeter applied to termianls ($x$) and ($y$) of the input circuit would read the temperature error or deviation from the set point in degrees.

The thermocouple-bridge circuit is illustrated more in detail in FIG. 4. As there shown, the bridge branch, corresponding to R2 of FIG. 3, comprises resistors R6, Ra, Rb and R7 connected in series. There are provided in that leg of the bridge means for adjusting the temperature control range of the system. That means comprises potentiometer resistors R10 and R17 connected in parallel to each other and with potentiometer resistor R7 and resistors Rx and Ry shown as having suitable switching means 165 for changing the range from one value to another.

Another leg of the bridge corresponding to branch R3, FIG. 3, includes resistors R8, and R14 and the other two legs corresponding to R3 and R4, FIG. 3, comprise resistors R11 and R12, respectively. The reference or cold junction of the thermocouple is associated with the resistor R12 which is of pure nickel wire. Its resistance changes with temperature. The resistance values of R11 and R12 are such that a current of 1 milliampere flows through them. Thus as the temperature of R12 changes with ambient temperature, the voltage drop across it changes. This change in voltage drop compensates for the effect of ambient temperature change at the thermocouple reference junction TC2. The total resistance in the branch resistors R8 and R14 and the resistance branch containing R11, is such as to cause 1 milliampere of current to flow in those branches at a voltage of 1.345 volts.

The bridge is provided with a constant D.C. voltage source which is in series with a resistor R13. That voltage is provided by an A.C. power supply provided with rectifiers and a Zener diode for regulating the output voltage thereof to a constant value of approximately 1.345 volts. The voltage source is illustrated schematically in FIG. 6, as comprising a transformer having an input winding 165 operating at, say 117 volts, 60 cycles, and an output winding 166 that supplies the circuit. In one line 167 of the winding 166 is a rectifier or diode $D_1$, a resistor 168 and a resistor 169 connected in series. The circuit includes a condenser 170 of about 20 mfd. capacity connected from the junction of diode D1 and the resistor 168 to the other side or line 171 of winding 166. A condenser 172 of about 20 mfds. is connected across lines 167 and 171 between resistors 168 and 169. The D.C. output voltage of 1.345 volts is derived from a bridge which includes resistor 169, a resistor 173 of about 2.5K ohms, a Zener diode 174, a resistor 175 of about 2.2K ohms and a potentiometer 176 of about 500 ohms maximum.

Figure 6:
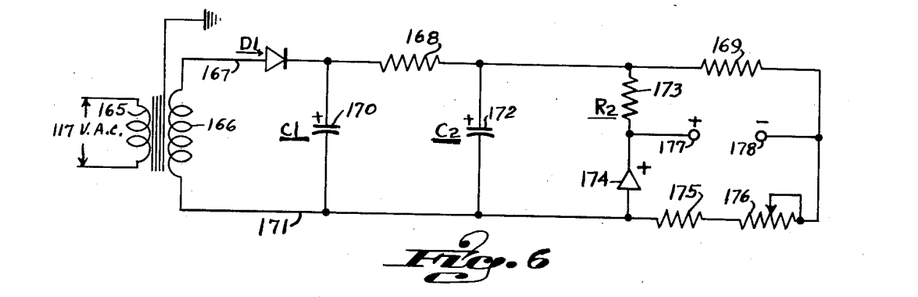
FIG. 6 is a more or less diagrammatic view of the Zener diode-controlled power supply for the thermocouple-bridge circuit of FIG. 5.

The D.C. output voltage is taken across the junction of the Zener diode 174 with the resistor 173 and the junction of the potentiometer 176 and the resistor 169. The diode 174 operates on the principle that when a silicon diode is operated in the avalanche, or Zener, break down portion of its reverse current characteristic, the voltage drop across it is largely independent of the current through it. Thus, the D.C. voltage appearing at the output terminals 177, 178 of FIGS. 4 and 6 is constant for all practical purposes at a value of say 1.345 volts. By employing a D.C. power source such as that shown in FIG. 6, the difficulties arising from aging D.C. batteries are eliminated.

Figure 9:
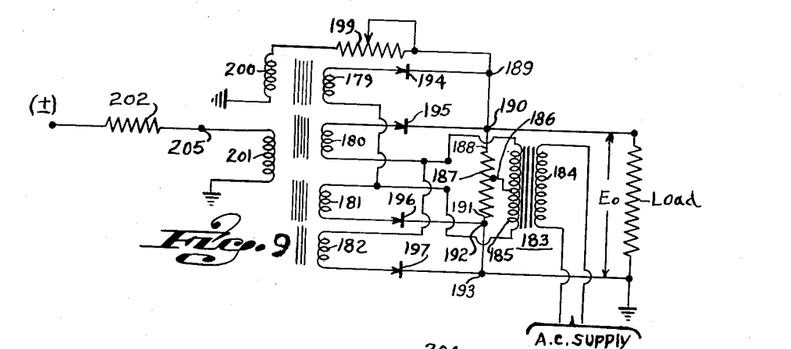
FIG. 9 is a more or less diagrammatic view of a magnetic amplifier such as embodied in FIGS. 1 and 2.

In FIGURE 9, the basic components of a magnetic amplifier or controller such as the one shown at 28 of FIGS. 1 and 2, are shown. Such an amplifier or controller includes a plurality of toroidal magnetic cores (not shown), having windings thereon. As indicated, there are four windings 179–182 supplied with A.C. voltage represented by means of a transformer 183 having an input winding 184 supplied with voltage at say for example 117 volts and an output winding 185 having a center tap 186. The center tap 186 is connected to a resistor 187. Terminal 188 of resistor 187 is connected to terminals 189 and 190 of the windings 179 and 180, while terminal 191 thereof is connected to terminals 192 and 193 of windings 181 and 182. Each winding is provided with a rectifier or diode. Thus, the corresponding terminals of windings 179 and 180 are provided with rectifiers 194 and 195, so that the outputs of these rectifiers are supplied to terminal 188 of resistor 187. Similarly, corresponding but opposed terminals of the windings 181 and 182 are provided with rectifiers 196 and 197 which are connected to terminal 191 of resistor 187. Thus, a full wave rectifier bridge is provided for windings 179–182 so that the output thereof is D.C. That output may be supplied to a load represented by the resistance $R_L$ or as in FIG. 2, to the reset winding 35. The amplifier of FIG. 9 is also shown as being provided with an internally supplied negative feed back, comprising an adjustable resistor 199 connected to output terminal 190 and to a negative feed back control winding 200. The amplifier includes an input winding or control winding 201 to which signals are supplied through an input resistor 202. The signal means disclosed causes the amplifier to operate as a proportional device having built-in negative feed back.

The amplifier shown basically in FIG. 9 may be modified as shown in FIGS. 10 through 14 in order to obtain operational characteristics which are useful in various control applications.

Figure 10:
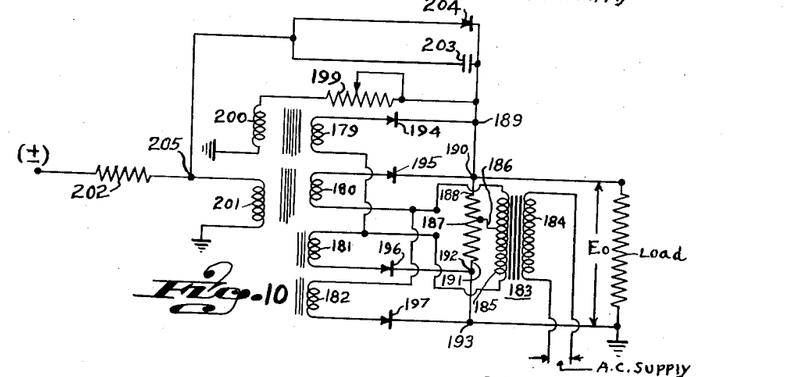
FIG. 10 is the magnetic amplifier of FIG. 9 provided with means by which it operates as an integrator.

If to the amplifier circuit shown in FIG. 9 a capacitor 203 and a rectifier 204, connected in parallel to the capacitor, as shown in FIG. 10, are connected between the input terminal 205 and the output terminal 190 thereof, the amplifier will operate as an integrator.

Figure 11:
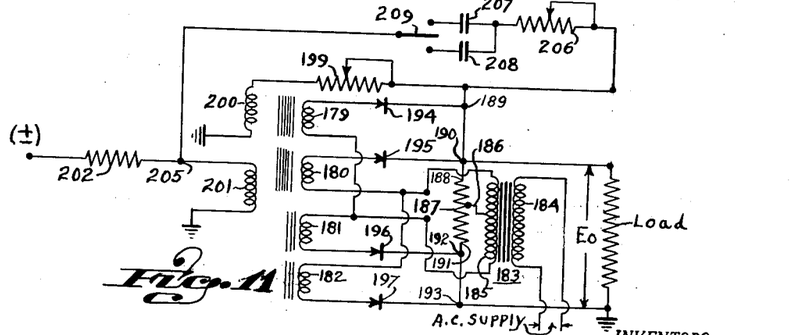
FIG. 11 is a view of the magnetic amplifier of FIG. 9 provided with means for causing the amplifier to operate as an integral plus proportional controller.

In FIGURE 11 a modification is shown in which the amplifier may be made to have integral plus proportional characteristics as a controller. In this case, a potentiometer 206 and a condenser 207 are connected in series between the terminals 190 and 205. A second condenser 208 is shown in parallel with condenser 207 and a switch 209 whereby the series resistance capacitor circuit may be varied. In other words, the condensers may have different capacities and by changing from one condenser to another, the integral plus proportional characteristics may be materially changed.

Figure 12:
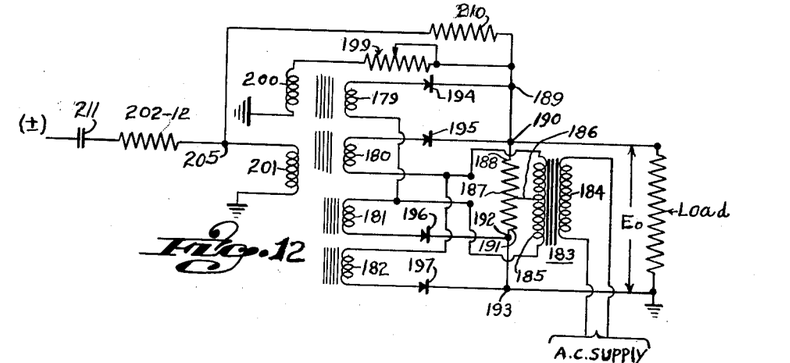
FIG. 12 is a view of the amplifier of FIG. 9 provided with means whereby it has rate response to the input to the amplifier.

In FIGURE 12 an arrangement is shown whereby the amplifier may have rate action characteristics. To obtain such characteristics, a resistor 210 is connected to the terminals 190 and 205 of the amplifier and a condenser 211 is connected in series with input resistor 202–12 and condenser 211. Thus, the input will have rate characteristics so that the input voltage appearing at the load of the amplifier will have rate action characteristics.

Figure 13:
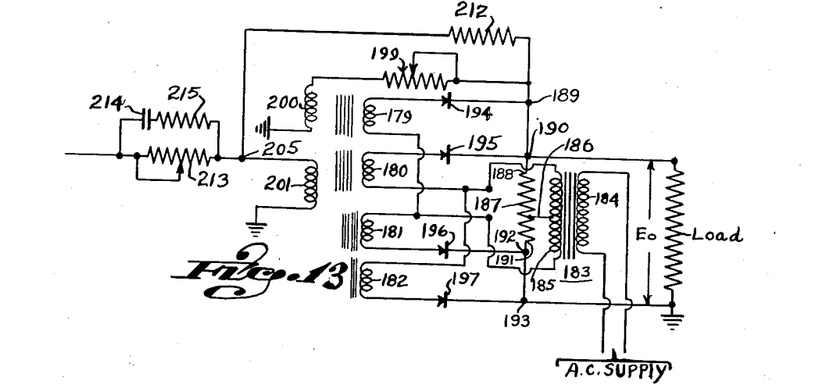
FIG. 13 is a view of the magnetic amplifier of FIG. 9 provided with a modified input circuit which provides rate action plus proportional gain.

In FIGURE 13, the amplifier of FIG. 9 is shown provided with a feed back resistor 212 which is externally connected to terminals 190 and 205. The input circuit is modified to provide an input resistance potentiometer 213 having in parallel therewith a series connected condenser 214, and a resistor 215. The potentiometer 213 with its parallel series connected condenser and resistor provide rate action and proportional gain amplification.

Figure 14:
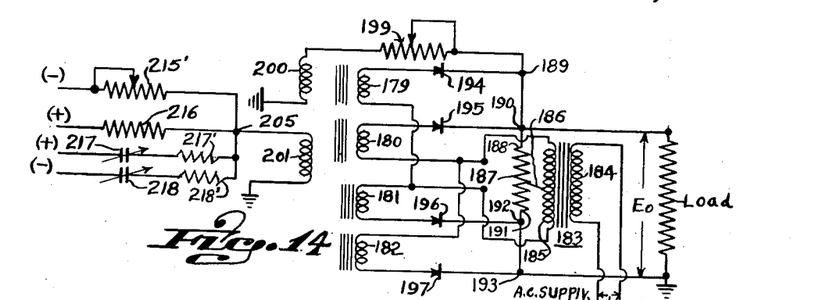
FIG. 14 is a view showing the magnetic amplifier of FIG. 9 provided with a plurality of variable input circuits one of which provides set point control, the others providing proportional plus rate response input.

FIG. 14 shows the amplifier of FIG. 9 modified to accept a plurality of inputs. As there shown, a negative input may be supplied through a potentiometer 215' that constitutes for example the set point of the amplifier when operating as a controller. Another input means is represented by a resistance 216, and two other inputs are represented by series connected condensers 217, 218 and resistors 217' and 218' connected in parallel to terminal 205. The input through resistor 216 represents a variable having linear function and may, for example, be proportional to changes in boiler water level in a boiler. The inputs represented by the two condensers 217 and 218, may, for example, have rate of change characteristics, as functions of the rate of flow of steam out of a boiler and the rate of flow of feed water into a boiler. The combined inputs are summed in the amplifier to produce one output. That output may be furnished to operate control equipment or other devices.

By means of the system and the components thereof, described in the foregoing and shown in the drawings, it is possible to regulate a variable condition with extreme accuracy. The particular application of the system to the regulation of the temperature of glass in a die which forms fibres or filaments of very fine diameters, is but an example of the sensitivity and the accuracy of the system. The glass at the die is regulated to ±¼° F. or less in a range of temperature of about 2000° to 2200° F. That range is not all inclusive, as the thermocouple bridge circuit can be modified to cause the system to regulate at other selected set point temperatures and still hold the temperature within the close limits indicated. The system is free of moving parts. The temperature is sensed by a thermocouple whose E.M.F. is supplied to a D.C. bridge. The output of the bridge is converted to A.C. which is amplified and demodulated and the output of demodulator is impressed on a potentiometer. The output of that potentiometer is divided, a portion being supplied to a magnetic amplifier and other portions thereof to a saturable reactor. The output of the amplifier is supplied to a winding on the saturable reactor to provide reset action. The other inputs thereto provide proportional gain and rate action. Thus, the inputs to the saturable reactor provide outputs which are utilized to control the current delivered to the die for heating the glass. As the temperature of the glass rises above the set point of the thermocouple-bridge circuit, the current to the die is decreased and, as the temperature falls below the set point, the current is increased. But the response to changes in temperature from the set point are rapid having rate action and the control system provides quickly responsive reset action so that there is substantially no over or under shooting of the set point temperature.

Also embodied in the system are magnetic amplifiers and various modifications thereof whereby the operating characteristics of the magnetic amplifier as an operational controller may be modified in many respects.

Having thus described the invention, it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. A system for regulating the heating of glass in a metal glass fiber forming die having glass forming orifices from which glass fibres issue and whose diameters are controlled by the temperature of the glass in the die, said system comprising means for passing electric current through the die, a controller for regulating the die current, a thermocouple-Wheatstone bridge circuit having the hot junction of the thermocouple in temperature sensing relation with the glass, said thermocouple-bridge circuit generating an E.M.F. proportional to the glass temperature, said bridge having means for establishing a temperature control set point E.M.F. whereby the bridge output is a function of the difference between said set point E.M.F. and the thermocouple E.M.F., electronic means for amplifying said E.M.F. difference, a magnetic amplifier, and an output reactor for controlling the die heating current controller, said magnetic amplifier having an input winding responsive to said amplifier output, the output reactor having a saturable magnetic core structure having thereon power windings energizable by A.C. voltage and rectifier means in circuit with said windings whereby a D.C. output is provided, and input control windings on said core structure, one of which is a reset winding connected to the output of the magnetic amplifier for controlling the magnetization of the core structure in accordance with the time integral of the difference between said set point and the thermocouple E.M.F.'s, another of said input windings magnetizing said core structure in accordance with the rate of change of the difference between said set point and thermocouple E.M.F.'s, and another of which input windings provides magnetization of said core structure to establish proportional band control to the die current controller, the die current controller being responsive to the output of said saturable controller to control the current in such manner as to hold the temperature error within predetermined limits of the set point temperature, said saturable controller being provided with a die current limit control winding, and means responsive to the magnitude of the die heating current for so energizing the die current limit winding that the output of the reactor limits the current output of the die curren controller to a predetermined maximum value.

2. A system as in claim 1 in which the magnetic controller is provided with a control winding energizable in accordance with the current supplied to said die and operating to so modify the magnetization of the core structure that the current to the die is limited to a predetermined maximum value.

3. A system for regulating the heating of glass in a metal glass fibre forming die having glass forming orifices from which glass fibres issue and whose diameters are controlled by the temperature of the glass in the die, said system comprising means for passing electric current through the die, a controller for regulating the die current, a thermocouple-Wheatstone bridge circuit having the hot junction of the thermocouple in temperature sensing relation with the glass, said thermocouple-bridge circuit generating an E.M.F. proportional to the glass temperature, said bridge having means for establishing a temperature control set point E.M.F. whereby the bridge output is a function of the difference between said set point E.M.F. and the thermocouple E.M.F., electronic means for amplifying said E.M.F. difference, a magnetic amplifier, and an output reactor for controlling the die heating current controller, said magnetic amplifier having an input winding responsive to said amplifier output, the output reactor having a saturable magnetic core structure having thereon power windings energizable by A.C. voltage and rectifier means in circuit with said windings whereby a D.C. output is provided, and input control windings on said core structure, one of which is a reset winding connected to the output of the magnetic amplifier for controlling the magnetization of the core structure in accordance with the time integral of the difference between said set point and the thermocouple E.M.F.'s, another of said input windings magnetizing said core structure in accordance with the rate of change of the difference between said set point and thermocouple E.M.F.'s, and another of which input windings provides magnetization of said core structure to estabilsh proportional band control to the die current controller, the die current controller being responsive to the output of said saturable controller to control the current in such manner as to hold the temperature error within predetemined limits of the set point tempeature, said saturable controller being provided with a bias winding and means for energizing the same to provide a predetermined bias magnetization thereof and with a die current limit control winding, said saturable controller being provided with a die current limit control winding, and means responsive to the magnitude of the die heating current for so energizing the die current limit winding that the output of the reactor limits the current output of the die current controller to a predetermined maximum value.

References Cited in the file of this patent

UNITED STATES PATENTS

| | | |
|---|---|---|
| 2,453,864 | Schlehr | Nov. 16, 1948 |
| 2,495,844 | Hornfeck | Jan. 31, 1950 |
| 2,514,627 | Cook | July 11, 1950 |
| 2,692,296 | De Piolenc et al. | Oct. 19, 1954 |
| 2,714,622 | McMullen | Aug. 2, 1955 |
| 2,747,006 | Barnard | May 22, 1956 |
| 2,794,058 | Russell | May 28, 1957 |
| 2,810,526 | Rogers | Oct. 22, 1957 |
| 2,831,929 | Rossi et al. | Apr. 22, 1958 |
| 2,882,352 | Rote | Apr. 14, 1959 |
| 2,938,159 | Morgan | May 24, 1960 |
| 2,942,175 | Wright | June 21, 1960 |